Patented Sept. 3, 1946

2,407,008

UNITED STATES PATENT OFFICE 2,407,008

RECOVERY OF VANADIUM

Arthur W. Hixson, Leonia, N. J., and Ralph Miller, New York, N. Y., assignors to The Chemical Foundation, Incorporated, a corporation of Delaware, as trustee No Drawing. Application July 12, 1940, Serial No. 345,104

2 Claims. (Cl. 204—90)

This invention is concerned with the recovery of vanadium; and more particularly with its recovery from phosphoric acid solutions thereof.

The phosphate rock occuring in Wyoming, Idaho, Utah and Montana constitutes a source material for recovery of a considerable tonnage of vanadium. There is about one hundred times as much phosphorous pentoxide as vanadium pentoxide in the rock. This material is utilized by acidulating it with sulfuric acid to form phosphoric acid and insoluble calcium sulfate. The vanadium present in the rock accompanies the phosphorous and contaminates the resultant phosphoric acid. The ratio of phosphorous pentoxide to vanadium pentoxide remains constant so that the acid contains about one hundred times as much $P_2O_5$ as $V_2O_5$.

Efforts have been made for a long time to find an economical method of recovering the vanadium contained in this acid. The necessity for an economical process is evident from the following considerations. Vanadium pentoxide is sold for 27½ cents per pound in the form of a concentrate. Two hundred pounds of 50% $P_2O_5$ phosphoric acid contains one pound of vanadium pentoxide. Assuming all the vanadium contained in the acid is recovered, the two hundred pound batch of acid must be treated for a sum much less than 27½ cents. All the efforts in the past have been expended in the one direction. That is, to add a reagent to the acid which will cause a solid containing the vanadium to precipitate. The obvious costs of a process of this type are, primarily, the expense of a reagent and the cost of the separation operation. Another important factor requiring consideration is the possible contamination of the acid by the reagent, as well as the acid consumed.

Because two hundred pounds of 50% $P_2O_5$ phosphoric acid must be treated to obtain one pound of vanadium pentoxide, only a small percentage by weight of reagent can be employed if costs are not to be prohibitive. This method, consequently, possesses definite limitations.

We have discovered that vanadium can be separated from phsphoric acid solutions by subjecting the vanadium-containing phosphoric acid solutions to electrolysis. We have found that a vanadium-containing solid is deposited at the anode when vanadium-containing phosphoric acid solutions are electrolyzed. The vanadium-containing solid is a vanadophosphate. It tends to adhere to the anode and it is necessary to prevent the non-conducting solid from completely covering the electrode and stopping the flow of current. When the electrode becomes partially coated, the current density rises and this causes the voltage drop across the cell to increase. We have found that by taking the precaution of keeping the electrode relatively free from the solid which tends to form at its surface, the voltage required is less than four volts. We have further found that a diaphragm cell enables the process to be carried out at almost 100% current efficiency provided the current density is less than about five amperes per square decimeter, and moderate agitation is employed. An insoluble anode should be used. Lead anodes are satisfactory. The cathode may be of almost any material, such as iron. These materials are suitable when excessive polarization is avoided by suitable current densities.

The present method of recovering vanadium represents a complete departure from all former methods that have been advanced. It is noteworthy that it avoids using any reagent whatever. This precludes the possibility of contaminating the phosphoric acid. In addition, no acid is wasted or consumed. An important advantage is the ready availability of electricity. The disadvantage is the necessity for electrolytic cells.

There are two general methods by which our discovery can be utilized in practice. In one method the electrolysis is carried out at as low a temperature as practical so that the solid forms at the electrode. The electrolysis is continued until no further solid forms. The solid is then separated from the acid. A more advantageous method is to carry out the electrolysis at any convenient temperature. The solution is circulated rapidly past the electrode surface. The solution is then maintained at as low a temperature as possible in an auxiliary storage vessel to permit the vanadium-containing solid to form. The solid may then be separated from the acid.

It has been pointed out that the solid formed at the electrode is not permitted to adhere thereto. Consequently the amount of vanadium-containing solid that may be recovered is dependent upon the solubility of the solid in the acid. The solubility of the anode reaction product varies with the temperature and strength of acid. The lower the temperature, the smaller the solubility. The solubility at low temperatures is a minimum at about 65% phosphoric acid. The anode reaction product may be formed at that acid concentration and temperature which is most advantageous. The acid containing the reaction product may then have its concentration and temperature adjusted so that the solubility of the reaction product is a minimum. The difference between the initial concentration of vanadium in the acid and the minimum solubility of the anode reaction product may be recovered. The percentage recovery will depend upon the initial ratio of vanadium pentoxide to phosphorous pentoxide. At a temperature of about 25° C. and 65% phosphoric acid, the minimum ratio that can be achieved is about one part of vanadium pentoxide to 1570 parts of phosphorous pentoxide. If the initial ratio is one part of vanadium pentoxide to 100 parts of phosphorous pentoxide, then 93.6% of the vanadium can be recovered.

We claim:

1. The process of recovering vanadium as vanadophosphate from vanadium-containing phosphoric acid solutions consisting in electrolyzing such solutions at about 25° C. and an acid concentration of about 65% phosphoric acid to form a vanadium-containing solid at the anode, and separating such solid from the acid solution.

2. The process of recovering vanadium as vanadophosphate from vanadium-containing phosphoric acid solutions consisting in electrolyzing such solutions, at elevated temperatures above 30° C. and any convenient acid concentration above 65% phosphoric acid, in a diaphragm cell, the anode reaction product being soluble in the acid under the prevalent conditions; removing the anolyte containing the dissolved anode reaction product, and subsequently adjusting the phosphoric acid concentration to approximately 65% phosphoric acid and a temperature below 30° C. and thereby forming an insoluble anode reaction product, and separating the vanadium-containing solid from the acid.

ARTHUR W. HIXSON.
RALPH MILLER.